(12) United States Patent
Rhea

(10) Patent No.: US 7,077,427 B2
(45) Date of Patent: Jul. 18, 2006

(54) STEERING WHEEL ASSEMBLY

(75) Inventor: Scott L. Rhea, Albion, IN (US)

(73) Assignee: Autoliv ASP, Inc., Ogden, UT (US)

( * ) Notice: Subject to any disclaimer, the term of this patent is extended or adjusted under 35 U.S.C. 154(b) by 124 days.

(21) Appl. No.: 10/621,177

(22) Filed: Jul. 16, 2003

(65) Prior Publication Data

US 2005/0012310 A1  Jan. 20, 2005

(51) Int. Cl.
*B60R 21/203* (2006.01)
*B60R 21/215* (2006.01)

(52) U.S. Cl. .................................. 280/731; 200/61.55

(58) Field of Classification Search .. 200/61.54–61.56; 280/731; 74/552, 558
See application file for complete search history.

(56) References Cited

U.S. PATENT DOCUMENTS

| | | | |
|---|---|---|---|
| 5,228,362 A | 7/1993 | Chen et al. | |
| 5,338,906 A | 8/1994 | Yokota | |
| 5,431,438 A * | 7/1995 | Manabe | ...................... 280/731 |
| 5,456,488 A | 10/1995 | Bauer | |
| 5,738,369 A | 4/1998 | Durrani | |
| 5,829,777 A * | 11/1998 | Sakurai et al. | ............ 280/728.2 |
| 5,957,489 A | 9/1999 | Sahara et al. | |
| 6,086,090 A | 7/2000 | Fischer | |
| 6,139,051 A * | 10/2000 | Fujita | ......................... 280/731 |
| 6,231,074 B1 | 5/2001 | Vian | |
| 6,312,012 B1 | 11/2001 | Bohn et al. | |
| 6,364,344 B1 | 4/2002 | Hudd et al. | |
| 6,402,193 B1 | 6/2002 | Fleckenstein | |
| 6,426,473 B1 | 7/2002 | Derrick et al. | |
| 6,508,485 B1 * | 1/2003 | Kikuta et al. | ............. 280/728.2 |
| 6,616,180 B1 * | 9/2003 | Schutz | ........................ 280/731 |
| 6,639,160 B1 * | 10/2003 | Ibe et al. | .................. 200/61.54 |
| 6,719,323 B1 | 4/2004 | Kai et al. | .................... 280/731 |
| 2002/0124682 A1 * | 9/2002 | Schutz | ......................... 74/552 |

FOREIGN PATENT DOCUMENTS

DE  19725684 C1 * 12/1998
EP  0 560 355    9/1993

* cited by examiner

*Primary Examiner*—Lesley D. Morris
*Assistant Examiner*—Laura B. Rosenberg
(74) *Attorney, Agent, or Firm*—Sally J Brown

(57) ABSTRACT

The present invention relates to a steering wheel assembly. The steering wheel assembly has a center portion and an outer rim. The outer rim encircles the center portion. A cover and an upper housing are also added to the center portion. The cover goes over the top of the center portion whereas the upper housing is positioned below the cover. The upper housing is constructed such that it is capable of being depressed from a normal position to a compressed position. An intermediate portion is also added to the steering wheel. The intermediate portion is positioned between the outer rim and the center portion and forms an interface with the cover. The steering wheel is constructed such that when the upper housing is in the normal position, there is no gap at the interface between the cover and the intermediate portion. This may be accomplished by constructing the intermediate portion to include an overhanging portion that overlaps and fits together with the cover. Alternatively, a shingle that attaches the cover to the intermediate portion may be used to prevent a gap from forming at the interface when the upper housing is in the normal position.

22 Claims, 5 Drawing Sheets

STEERING WHEEL ASSEMBLY

BACKGROUND OF THE INVENTION

1. Field of the Invention

The present invention relates to steering wheel and airbag assemblies, as well as their interfaces on motor vehicles. More specifically, the invention relates to a novel steering wheel and airbag assembly that eliminates the gap between the driver's side airbag cover and the steering wheel.

2. Description of Related Art

Steering wheels are universally used as an essential component of a motor vehicle. Through the steering wheel, the vehicle driver steers and controls the vehicle. The steering wheel controls the vehicle's steering assembly such that the vehicle driver is able to control the vehicle's movement and direction by simply rotating the steering wheel.

Traditionally, a steering wheel includes two sections: a center portion (often called a "center" or a "body") that is coupled to an outer rim (sometimes called a "rim"). The outer rim encircles the center portion and is designed to receive the driver's hands. Usually, the steering wheel is designed such that the driver will guide the vehicle by pulling and/or turning the outer rim.

The center portion is generally mounted to a steering column. The steering column extends from the vehicle's dashboard and is used to couple the steering wheel to the steering assembly. Gears, shafts, mechanical linkages, electrical linkages, or other similar features are then added to the steering column. Upon rotation of the steering wheel, these gears and/or other features engage the steering assembly and cause the vehicle to turn or move in the desired direction.

Additionally, because most vehicles possess a horn, most steering wheels are now designed to include a horn assembly. The horn assembly is positioned on the center portion and is capable of producing a sound. The horn assembly is generally designed such that if a driver or other vehicle occupant presses inwardly on a horn switch and/or the center portion, the horn assembly will actuate and a sound will be produced. Preferably, such horn assemblies are spring-loaded such that a vehicle occupant may actuate the horn assembly by pressing and/or touching the horn switch and/or the center portion with a single hand.

Recently steering wheel designs have further been affected by automotive design trends that include the incorporation of the switches onto the steering wheel. For example, many steering wheels now include speed control switches, cruise-control switches, radio switches, audio switches, telephone switches, global-positioning satellite switches, as well as other types of switches. Other steering wheels have been made to include decorative and/or functional features such as lights, message boards, gauges, foam, spokes, spoke covers, decorative spoke finishers, and the like.

Perhaps the most sweeping change in the design of steering wheels is the inclusion of inflatable safety restraints or airbags within the center portion. Airbags are designed to inflate to prevent the vehicle occupant from harmfully impacting the steering wheel, the steering column, the windshield, the dashboard, or other portions of the vehicle interior during a crash.

The airbag is generally housed within an airbag module that has been added to the center portion. An airbag cover that goes over the module is also added. The cover is usually made of a rigid plastic material and is made to open by the pressure from the deploying airbag. During deployment of the airbag, it is preferable to retain the airbag cover in at least partial attachment to the vehicle to prevent the airbag cover from flying loose in the passenger compartment. If the airbag cover were allowed to detach and freely move into the passenger compartment, it could cause injury to a passenger.

The airbag is generally linked to a control system that controls its deployment when an collision occurs. The control system is often called an electronic control system or "ECU". The ECU includes a sensor that continuously monitors the acceleration and deceleration of the vehicle. This information is sent to a processor which processes it using an algorithm to determine if a deceleration experienced by the vehicle is a collision or not. If this accelerometer measures an abnormal deceleration, such as one caused by a collision event, it triggers the airbag inflator.

When the ECU determines, based on a set of pre-determined criteria, that the vehicle is experiencing a collision, the ECU transmits an electrical current to an initiator assembly. The initiator assembly is in turn connected to an inflator that is coupled to the airbag module. The initiator activates the inflator. An inflator is generally a gas generator that typically uses a compressed or liquefied gas or mixture of gases, a solid fuel, or some combination of the two, to rapidly generate a large volume of inflation gas. This inflation gas is then channeled, often through a segment of specialized tubing called a gas guide, to the airbag. The gas inflates the airbag, allowing it to absorb the impact of the vehicle occupants and thus protecting them from harmful impact against the vehicle interior.

As experience with the manufacturer and use of airbags has progressed, the engineering challenges in their design, construction, and use have become better understood. For example, most steering wheels are currently designed such that there is a gap or opening that separates the airbag module from the adjoining section of the steering wheel. The reason for this gap is that steering wheel manufacturers believe that in order to allow the horn switch and/or the center portion to depress during actuation of the horn assembly, the horn assembly must be completely separated from the airbag module. As a result, an opening is added to the steering wheel to achieve the desired separation.

Unfortunately, constructing a steering wheel such that there is a gap positioned between the airbag module and the other portions of the steering wheel significantly raises the manufacturer's overall production costs. By requiring a gap to surround the airbag module, the overall complexity and sophistication of the steering wheel is greatly increased. Accordingly, manufacturers are required to expend additional time, resources, and skill in assembling, installing, and testing the steering wheel units. The significance of such a cost increase cannot be over-emphasized because in the highly competitive automobile industry, even slight increases in production costs can greatly influence the overall profit margin on a mass-produced vehicle.

Moreover, including a gap on a steering wheel has a further limitation in that over the life of the vehicle, containments such as dirt, dust, moisture, and the like tend to collect and accumulate within the steering wheel gap. This accumulation of dirt makes the steering wheel undesirable and visually unappealing to most consumers. As a result, the overall satisfaction and enjoyment associated with driving and/or owning the vehicle will be greatly diminished.

In addition, placing a gap on the steering wheel is very inviting to curious children and others that like to poke, pick, scratch, or otherwise tamper with the steering wheel. Like the accumulation of dirt discussed above, such poking will, over time, deteriorate the visual appearance of the steering wheel and reduce the vehicle's overall desirability.

Current automotive industries continue to increase the requirement for improved cosmetic and appearance of steering wheel to airbag fist to compete in the market, thus requiring closely held gaps and tolerances of mating surfaces. Accordingly, there is a need in the art for a novel steering wheel that addresses and/or solves one or more of the above-listed problems. Such a device is disclosed herein.

SUMMARY OF THE INVENTION

The present invention has been developed in response to the present state of the art, and in particular, in response to problems and needs in the art that have not yet been fully solved by currently available steering wheels. The steering wheel of the present invention comprises a center portion and an outer rim. The outer rim encircles the center portion. As the outer rim may not be attractive to a vehicle occupant, a coating may be added to cover the outer rim and improve the visual appearance and feel of the steering wheel.

An intermediate portion is also included in the steering wheel assembly. More than one intermediate portion may also be used. In this application, the term "intermediate portion" refers to any portion of the steering wheel and/or any feature that has been added to the steering wheel that is positioned between the outer rim and the center portion. Specifically, the intermediate portion may fully or partially comprise one or more functional features such as speed control switches, cruise control switches, radio switches, audio switches, telephone switches, horn switches, global-positioning satellite switches, other types of switches, lights, message boards, gauges, and the like. In other embodiments, the intermediate portion may partially or fully comprise one or more decorative features such as pieces of foam, spokes, spoke covers, decorative spoke finishers, and the like.

The steering wheel further comprises an airbag cover that goes over the top of the center portion. The cover forms the upper boundary of the center portion and, like the coating, is designed to improve the visual appearance of the steering wheel. Preferably, the cover forms an interface with the intermediate portion The lower and side boundaries of the center portion may be defined by a shell. The shell is a covering or layer of material that encloses the center portion. The shell encloses a casting that is designed to provide structure and/or support to the center portion and the steering wheel.

An upper housing is also added to the center portion. The upper housing is positioned below the cover and is designed to enclose and/or retain all or a portion of an airbag and an inflator within the center portion. Preferably, a lower housing designed to support the airbag and the inflator is also added to the center portion.

The upper housing is capable of being depressed from a normal position into a compressed position. More particularly, the steering wheel is constructed such that if a vehicle occupant presses upon the cover, the upper housing will depress and move inwardly into a compressed position.

Additionally, the steering wheel may further include a horn assembly. The horn assembly may comprise a first electrical contact, a second electrical contact, and one or more springs. The horn assembly is configured such that if the upper housing is depressed from the normal position into the compressed position, the first electrical contact will come into contact with the second electrical contact and the horn assembly will be actuated.

The steering wheel is further designed such that when the steering wheel is in the normal position, there is no gap at the interface between the cover and the intermediate portion. In one embodiment, this is accomplished by constructing the intermediate portion to include an overhanging portion. The overhanging portion is positioned at the interface between the intermediate portion and the cover and is designed to overlap the cover. Preferably, the overhanging portion fits tightly with the cover and prevents a gap from forming at the interface between the intermediate portion and the cover when the upper housing is in the normal position.

This embodiment is constructed such that if the upper housing is depressed from the normal position into the compressed position, a gap will be formed at the interface between the cover and the intermediate portion. More particularly, as a vehicle occupant presses inwardly on the cover, the upper housing and the cover moves inwardly. In turn, this movement carries the cover away from the overhanging portion and produces the gap at the interface.

In an alternative embodiment, the steering wheel includes a shingle. The shingle is a portion of the cover that is positioned at the interface between the cover and the intermediate portion. The shingle is attached to the intermediate portion such that when the upper housing is in the normal position, there is no gap at the interface between the intermediate portion and the cover.

A flex point may also be added to the steering wheel airbag assembly. The flex point is a depression or other feature that is added to the cover on or proximate to the shingle. The flex point is designed to allow the cover and/or the shingle to bend or flex when the upper housing moves between the normal position and the compressed position.

In this embodiment, depressing the upper housing from the normal position into the compressed position does not produce a gap at the interface between the cover and the intermediate portion. Rather, when the vehicle occupant presses inwardly on the cover, the flex point allows the cover and/or the shingle to move and/or bend to compensate for the movement of the upper housing. As a result, even when the upper housing is in the compressed position, there is no gap formed at the interface between the cover and the intermediate portion.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–5, wherein like parts are designated by like numerals throughout. The members of the present invention, as generally described and illustrated in the Figures, may be constructed in a wide variety of configurations. Thus, the following more detailed description of the embodiments of the present invention, as represented in the Figures, is not intended to limit the scope of the invention, as claimed, but is merely representative of presently preferred embodiments of the invention.

Figure 1:
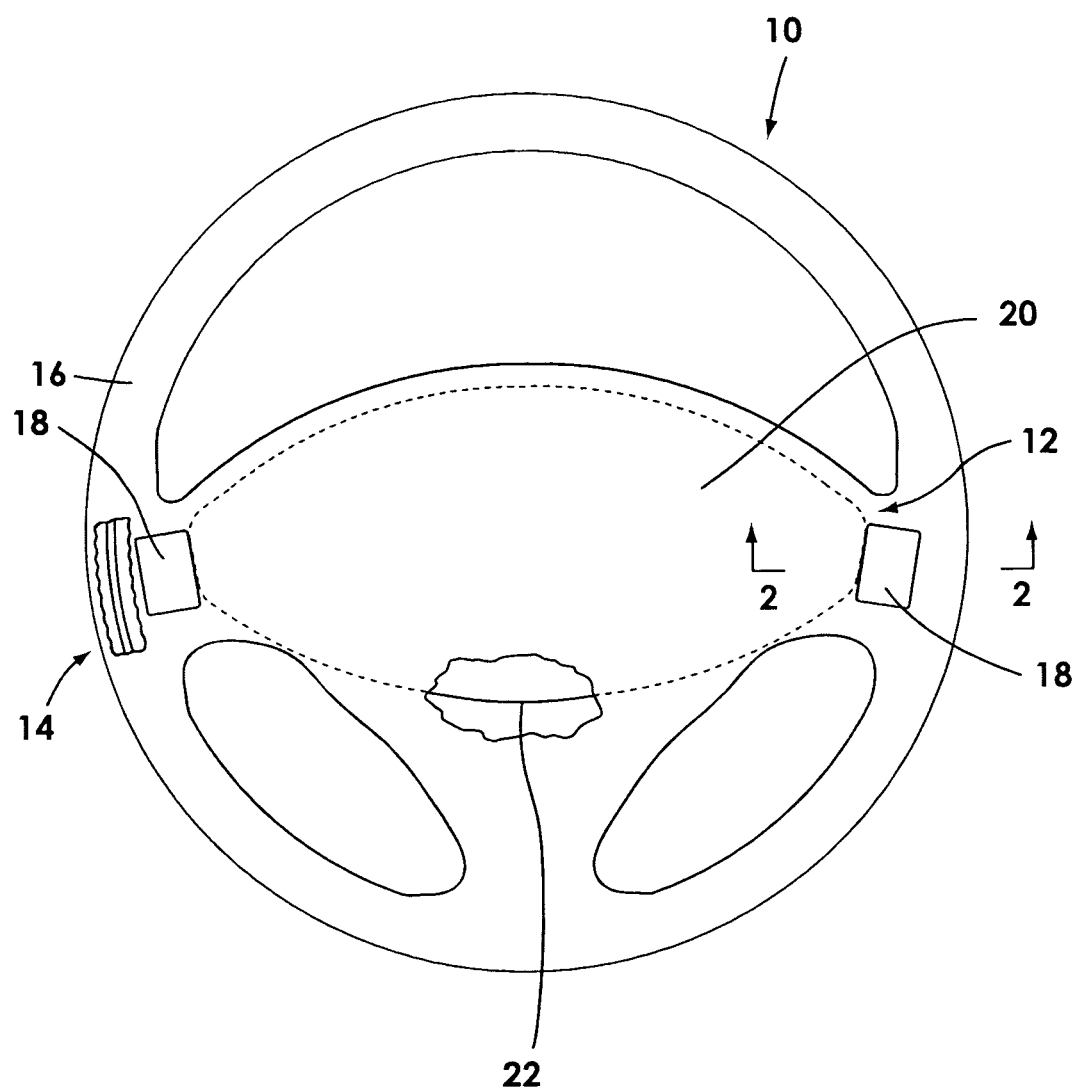
FIG. 1 is a partially cutaway front plan view of a steering wheel according to one embodiment of the present invention.

Referring now to FIG. 1, a front plan view of a steering wheel 10 of the present invention is depicted. The steering wheel 10 may be mounted in a vehicle (not shown). In general, the steering wheel 10 comprises a center portion 12 and an outer rim 14. The outer rim 14 encircles the center portion 12 and is generally made of metal such as steel, aluminum, magnesium, and the like. A coating 16 of polyurethane, polyvinyl, polypropylene, synthetic resin, fabric, foam, or the like, may also be added to the outer rim 14 to improve the visual appearance of the steering wheel 10.

The steering wheel 10 also includes an intermediate portion 18. More than one intermediate portion 18 may also be used. As used herein, the term "intermediate portion" refers to any portion of the steering wheel 10 and/or any feature that is positioned between the outer rim 14 and the center portion 12. Specifically, the intermediate portion 18 may fully or partially comprise one or more functional features such as speed control switches, cruise control switches, radio switches, audio switches, telephone switches, horn switches, global-positioning satellite switches, other types of switches, lights, message boards, gauges, and the like. In other embodiments, the intermediate portion 18 may partially or fully comprise one or more decorative features such as pieces of foam, spokes, spoke covers, decorative spoke finishers, and the like.

The steering wheel 10 further comprises an airbag cover 20. The cover 20 may comprise a layer of polyurethane, polyvinyl, polypropylene, synthetic resin, fabric, foam, and the like that goes over the top of the center portion 12. Preferably, the cover 20 is the upper boundary of the center portion 12.

An upper housing 22 may form a portion of the structure of the steering wheel 10. The upper housing 22 is positioned below the cover 20 and is made of metal stampings, plastic, or other similar materials. Preferably, the upper housing 22 is designed such that it is capable of enclosing and/or holding an airbag (not shown) within the center portion 12.

In FIG. 1, the upper housing 22 is shown in a substantially elliptical shape and the intermediate portion 18 is shown in a substantially rectangular shape. Those of skill in the art will recognize that these structures may have a wide variety of shapes within the scope of the invention. Specifically, the upper housing 22 and/or the intermediate portion 18 may have a round, triangular, quadrilateral, polygonal, or any other desired shape.

Figure 2:
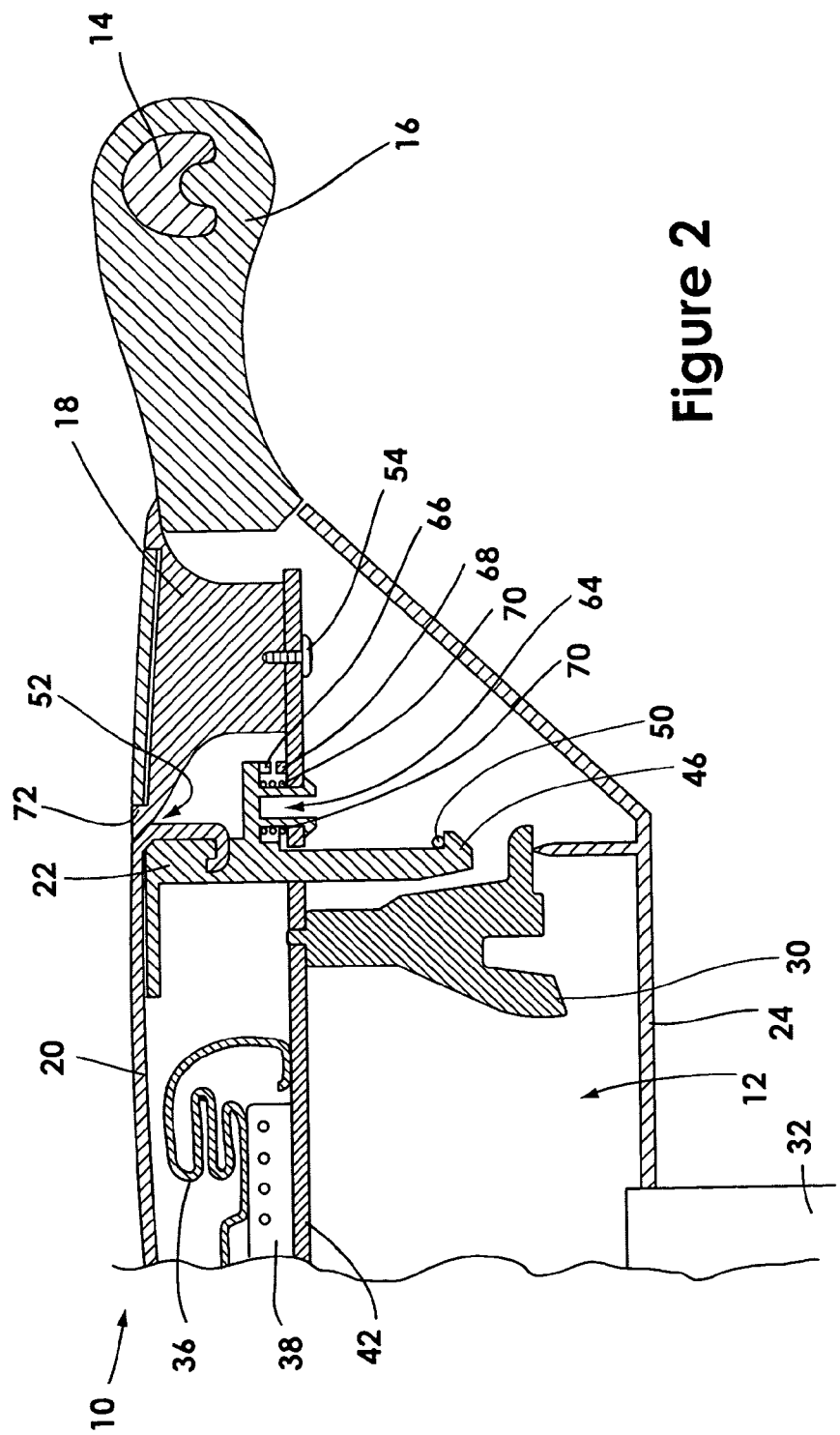
FIG. 2 is a cross-sectional view of the steering wheel of FIG. 1 in which the steering wheel's upper housing is in the normal position.

Referring now to FIG. 2, a cross-sectional view taken through line 2—2 of FIG. 1 illustrates the internal components of the steering wheel 10. As can be seen in FIG. 2, the center portion 12 includes a shell 24 that defines the bottom and the sides of the center portion 12. Preferably, the shell 24 is a covering made of material designed to improve the aesthetic appearance of the steering wheel 10 such as polyurethane, polyvinyl, polypropylene, synthetic resin, fabric, foam, and the like.

The center portion 12 also comprises a casting 30. The casting 30 that is made of metal such as steel, aluminum, magnesium, and the like and is designed such that it may be used to provide structure and support to the center portion 12 and the steering wheel 10. In the embodiment shown in FIG. 2, the shape of the casting 30 is selected such that a portion of the casting 30 contacts the shell 24. However, those of skill in the art will recognize that other shapes and/or configurations of the casting 30 may also be used.

The bottom of the center portion 12 is attached to a steering column 32. In turn, the steering column 32 is attached to a steering assembly (not shown) and comprises one or more gears and/or linkages (not shown) that engage the steering assembly and allow a vehicle occupant to control the vehicle's movement and direction by rotating the steering wheel 10.

The upper housing 22 and the cover 20 are also positioned on the center portion 12. The upper housing 22 and the cover 20 are used to enclose and/or retain all or a portion of an airbag 36 and an inflator 38 within the center portion 12. Preferably, the upper housing 22 and the cover 20 are configured such that the cover 20 is positioned directly over the top of the airbag 36.

A lower housing 42 may be positioned underneath or around the inflator 38 and the airbag 36. Like the upper housing 22, the lower housing 42 is made of plastic, metal stampings, and other similar materials that are capable of supporting the inflator 38 and the airbag 36. Preferably, the lower housing 42 is also connected to the casting 30 in order to provide additional strength and support to the airbag 36 and/or the inflator 38.

The steering wheel 10 is constructed such that in the event of an accident or crash, the airbag 36 will inflate and provide impact protection to a vehicle occupant. More specifically, if a crash occurs, a sensor (not shown) and/or a control unit (not shown) will detect the crash and activate the inflator 38. Once activated, the inflator 38 produces and/or channels a large volume of inflation gas into the airbag 36. Such an influx of inflation gas causes the airbag 36 to inflate. At the same time, the inflation gas also causes the airbag 36 to deploy through the cover 20. As a result, the inflated airbag 36 extends outwardly away from the steering wheel 10 into a position that prevents the vehicle occupant from harmfully impacting the steering wheel 10 during the crash.

One or more retention hangers 46 may also be positioned within the center portion 12. The retention hangers 46 are of the type known in the art and are designed to retain the upper housing 22 within the center portion 12 without the use of bolts. More specifically, the retention hangers 46 are configured such that when the upper housing 22 is added to the center portion 12, the hangers 46 engage a retaining wire 50 and cause the upper housing 22 to become bound within the center portion 12. Additional mounting methods may replace the hanger 46 and bolt the center portion 12 to the casting 30 and allow the upper housing 22 to float to a cycle horn.

The steering wheel 10 is further constructed such that the upper housing 22 is capable of being depressed from a normal position into a compressed position. As viewed in FIG. 2, the upper housing 22 is in the normal position.

Figure 3:
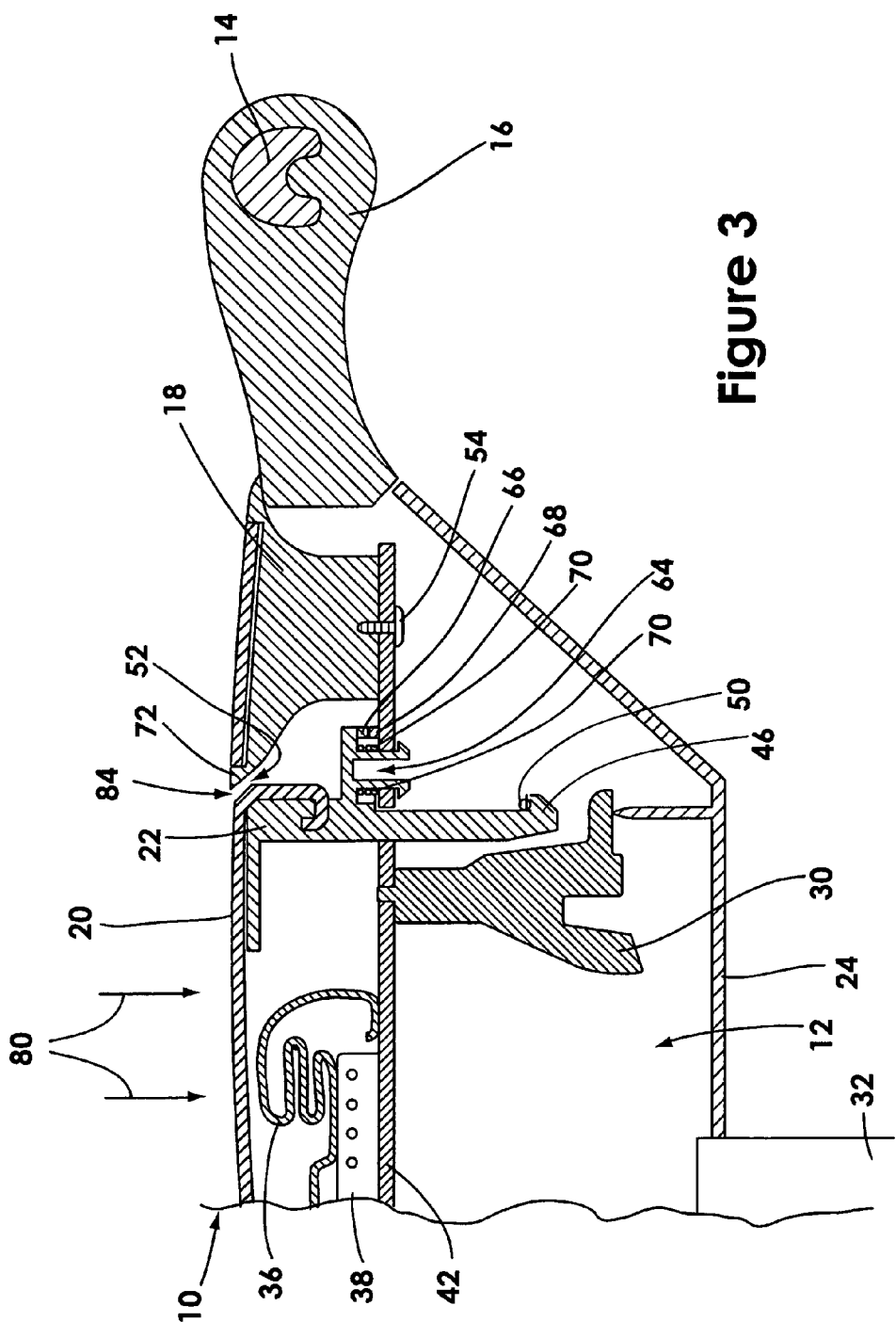
FIG. 3 is a cross-sectional view of the steering wheel of FIG. 1 after the steering wheel's upper housing has been depressed into the compressed position.

However, if a vehicle occupant presses inwardly upon the cover 20, the upper housing 22 will depress and move towards the steering column 32 into a compressed position (see FIG. 3).

Referring still to FIG. 2, the intermediate portion 18 is positioned between the outer rim 14 and the center portion 12. As illustrated, the intermediate portion 18 is positioned between the outer rim 14 and the upper housing 22, thereby creating an interface 52 between the intermediate portion 18 and the cover 20.

In the embodiment shown in FIG. 2, the intermediate portion 18 is attached to the steering wheel through the use of one or more fasteners 54. These fasteners 54 operate to mount the intermediate portion 18 to the lower housing 42. Preferably, the fasteners 54 comprise bolts, screws, nails, rivets, and the like, or can be held by a snap-in method with no hardware required.

Other types of fasteners and/or methods of connecting the intermediate portion 18 to the steering wheel 10 may also be used as part of the present invention. For example, some embodiments may be made in which the intermediate portion 18 is attached to the steering wheel 10 via welding or other similar methods. Still further embodiments may be made in which the intermediate portion 18 is connected to the center portion 12, the shell 24, the upper housing 22, the casting 30, and/or other parts of the steering wheel 10.

The steering wheel 10 may further include a horn assembly 64. The horn assembly 64 comprises a first electrical contact 66, a second electrical contact 68, and one or more springs 70. The steering wheel 10 is configured such that if the first electrical contact 66 touches and/or contacts the second electrical contact 68, the horn assembly 64 will be actuated and a sound will be produced. However, as seen in FIG. 2, when the upper housing 22 is in the normal position, the springs 70 bias the upper housing 22 towards the cover 20 and prevent the first electrical contact 66 from touching the second electrical contact 68.

In the embodiment shown in FIG. 2, the first contact 66 is positioned on the upper housing 22 whereas the second contact 68 and the springs 70 are positioned on the lower housing 42. Those of skill in the art will recognize that other embodiments may be made in which the number, position, and/or configuration of the first contacts 66, the second contacts 68, and the springs 70 is different from that which is shown in FIG. 2. For example, some embodiments may be made in which the horn assembly 64 comprises only one spring 70. Other embodiments may have two or more springs 70. Still further embodiments may employ more than one first contact 66 and/or more than one second contact 68. Yet further embodiments may have the springs 70, the first contact 66, and/or the second contact 68 positioned on the lower housing 42, the upper housing 22, the casting 30, the intermediate portion 18, and/or the center portion 12.

Additionally, the steering wheel 10 further comprises an overhanging portion 72. The overhanging portion 72 is added to the intermediate portion 18 at the interface 52 between the intermediate portion 18 and the cover 20. The overhanging portion 72 is constructed to overlap and fit tightly with the cover 20 such that when the upper housing 22 is in the normal position, there is no gap or opening at the interface 52 between the intermediate portion 18 and the cover 20.

Referring now to FIG. 3, a cross-sectional view of the steering wheel 10 is illustrated as a vehicle occupant (not shown) presses inwardly on the cover 20. The pressure and/or force applied by the vehicle occupant is represented graphically by arrows 80. As noted above, the steering wheel 10 is constructed such that as the vehicle occupant presses upon the cover, the upper housing 22 depresses and moves from the normal position of FIG. 2 to the compressed position shown in FIG. 3.

As can be seen in FIG. 3, depressing the upper housing 22 from the normal position into the compressed position produces a gap 84 at the interface 52 between the cover 20 and the intermediate portion 18. More particularly, as the vehicle occupant presses inwardly on the cover 20, the upper housing 22 and the cover 20 move in the direction of the steering column 32. Such movement carries the cover 20 away from the overhanging portion 72 and produces the gap 84.

Depressing the upper housing 22 from the normal position into the compressed position also operates to actuate the horn assembly 64. As the upper housing 22 moves into the compressed position, the biasing effect of the springs 70 is overcome and the first contact 66 moves into contact with the second contact 68. Once this contact is established, the horn assembly 64 actuates and a sound is produced.

The steering wheel 10 may further be constructed such that if the vehicle occupant no longer pushes inwardly on the cover 20, the upper housing 22 will move from the compressed position of FIG. 3 into the normal position of FIG. 2. Preferably, this is accomplished via the springs 70. As noted above, the springs 70 bias the upper housing 22 towards the cover 20. Thus, once the vehicle occupant no longer pushes inwardly on the cover 20, the biasing force of the springs 70 pushes and moves the upper housing 22 outwardly from the compressed position into the normal position.

Figure 4:
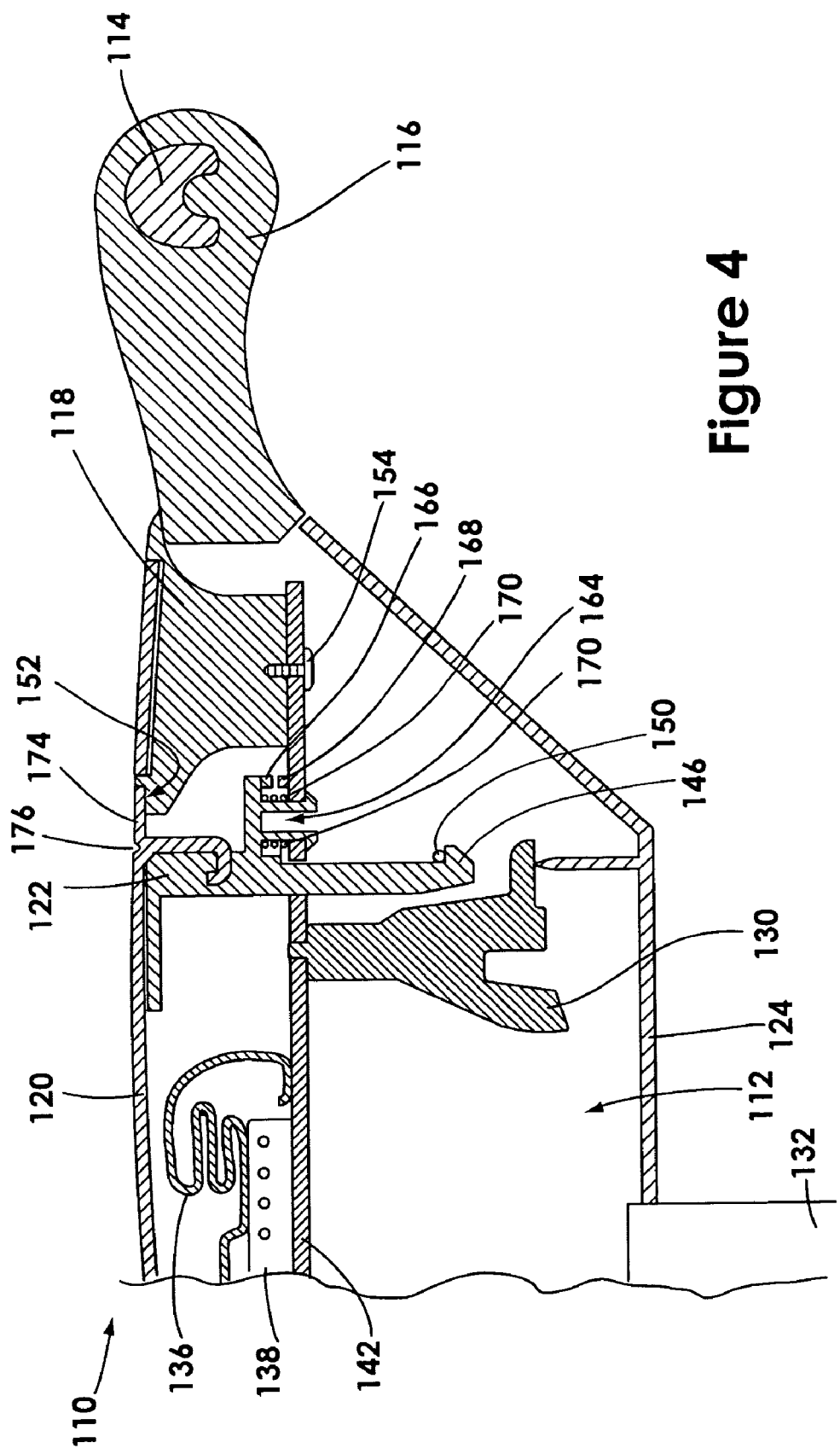
FIG. 4 is a cross-sectional view of a further embodiment of the steering wheel of the present invention in which the steering wheel's upper housing is in the normal position.

Referring now to FIG. 4, a different embodiment of the present invention is illustrated. FIG. 4 is a cross-sectional view of a steering wheel 110 that may be mounted on a vehicle (not shown). As can be seen in FIG. 4, most of the components and elements of steering wheel 110 are similar and/or equivalent to the components and elements that are found the embodiment that is described above.

As with the previous embodiment, the steering wheel 110 comprises a center portion 112 and an outer rim 114. The outer rim 114 encircles the center portion 112 is preferably covered by a coating 116. An intermediate portion 118 is also added to the steering wheel 110. The intermediate portion 118 is positioned between the outer rim 114 and the center portion 112. More than one intermediate portion 118 may also be used. Preferably, one or more fasteners 154 are used to mount the intermediate portion 118 to the steering wheel 110.

The steering wheel 110 further comprises an airbag cover 120. Like the previous embodiment, the cover 120 is a layer of polyurethane, polyvinyl, polypropylene, synthetic resin, fabric, foam, and the like that is positioned over the top of the center portion 112. Preferably, the cover 120 comprises the uppermost boundary of the center portion 112.

The bottom and sides of the center portion 112 are defined by a shell 124. The shell 124 is a layer of material that is designed to improve the visual appearance of the steering wheel 110. Preferably, the shell 124 is attached to a casting 130 that is capable of providing structure and support to the steering wheel 110. A steering column 132 may also be added.

An upper housing 122 may also be added to the steering wheel 110. The upper housing 122 is positioned below the cover 120 and is used to enclose and/or hold an airbag 136 and an inflator 138 within the center portion 112. Preferably, the upper housing 122 and the cover 120 are configured such that the cover 120 is positioned directly over the top of the airbag 136.

In the embodiment shown in FIG. 4, the upper housing 122 is attached to the center portion 112 with or without the use of bolts. This is accomplished by configuring the center portion 112 to include one or more retention hangers 146 that are designed to engage a retaining wire 150. However, other methods for attaching the upper housing 122 to the center portion 112 may also be used.

The center portion 112 may also include a lower housing 142. The lower housing 142 is positioned underneath the inflator 138 and the airbag 136 and is designed to support the inflator 138 and the airbag 136. Preferably, the lower housing 142 is also connected to the casting 130 in order to provide additional strength and support to the airbag 136 and/or the inflator 138.

As with the previous embodiment, the steering wheel 110 is constructed such that the upper housing 122 is capable of being depressed from a normal position into a compressed position. As viewed in FIG. 4, the upper housing 122 is in the normal position. However, if a vehicle occupant presses inwardly upon the cover 120, the upper housing 122 will depress and move towards the steering column 132 into a compressed position (see FIG. 5).

Referring still to FIG. 4, the steering wheel 110 may further include a horn assembly 164. Preferably, the horn assembly 164 comprises a first electrical contact 166, a second electrical contact 168, and one or more springs 170. Like the previous embodiment, the steering wheel 110 is configured such that if the first electrical contact 166 touches and/or contacts the second electrical contact 168, the horn assembly 164 will be actuated and a sound will be produced. However, as seen in FIG. 4, when the upper housing 122 is in the normal position, the springs 170 bias the upper housing 122 towards the cover 120 and prevent the first electrical contact 166 from touching the second electrical contact 168.

In the embodiment shown in FIG. 4, the first contact 166 is positioned on the upper housing 122 whereas the second contact 168 and the springs 170 are positioned on the lower housing 142. Those of skill in the art will recognize that other embodiments may be made in which the number, position, and/or configuration of the first contacts 166, the second contacts 168, and the springs 170 is different from that which is shown in FIG. 4. For example, some embodiments may be made in which the horn assembly 164 comprises only one spring 170. Other embodiments may have two or more springs 170. Still further embodiments may employ more than one first contact 166 and/or more than one second contact 168. Yet further embodiments may have the springs 170, the first contact 166, and/or the second contact 168 positioned on the lower housing 142, the upper housing 122, the casting 130, the intermediate portion 118, and/or the center portion 112.

Unlike the embodiment shown in FIG. 2, the steering wheel 110 is constructed such that it comprises a shingle 174. The shingle 174 is a portion of the cover 120 that is positioned at the interface 152 between the intermediate portion 118 and the cover 120. The shingle 174 is attached to the intermediate portion 118 such that when the upper housing 122 is in the normal position, there is no gap or opening at the interface 152 between the intermediate portion 118 and the cover 120.

A flex point 176 may also be added to the steering wheel 110. The flex point 176 is a depression or other feature that has been added to the cover 120 on or proximate to the shingle 174. The flex point 176 is designed to allow the cover 120 and/or the shingle 174 to bend or flex when the upper housing 122 moves between the normal position and the compressed position.

Figure 5:
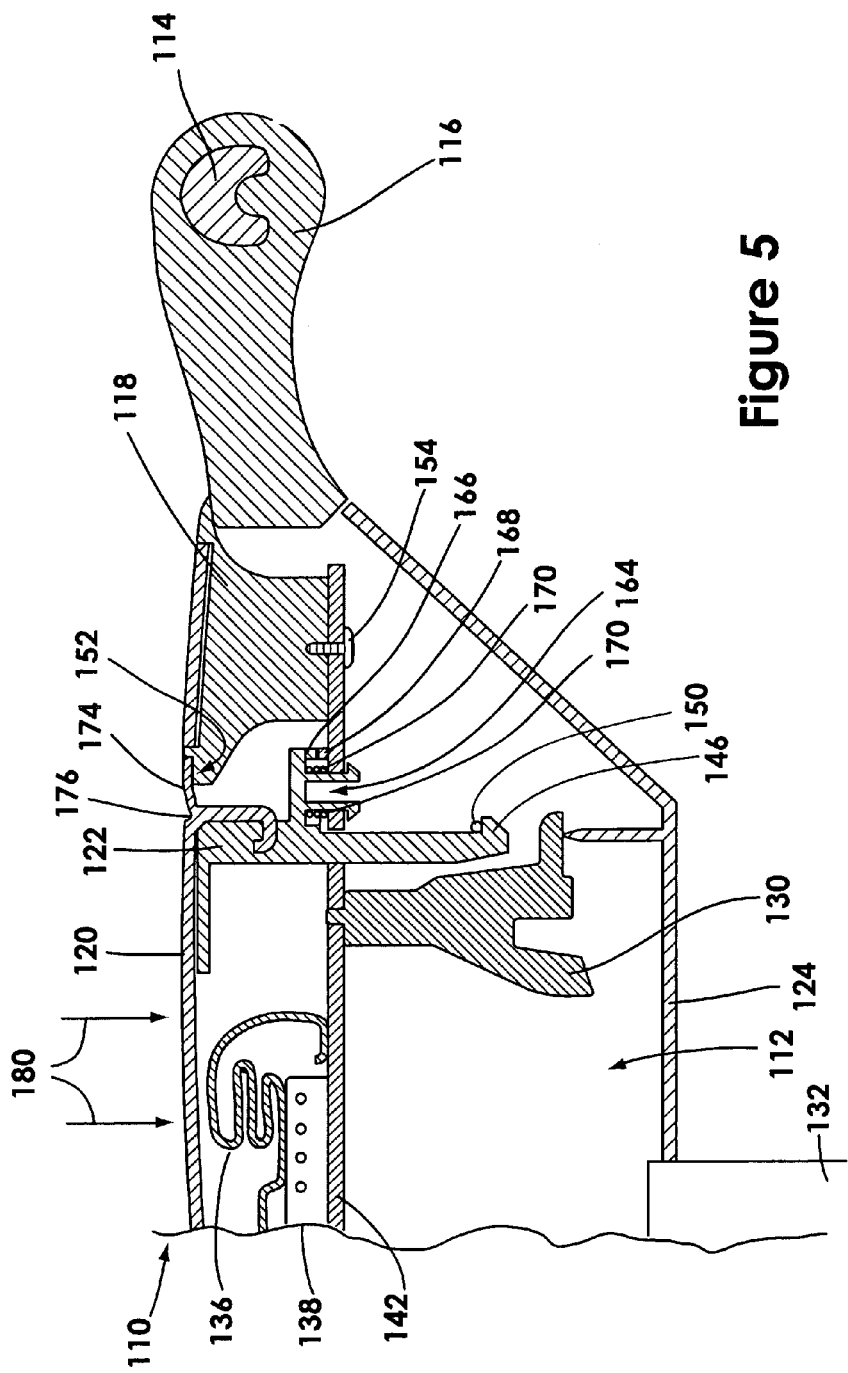
FIG. 5 is a cross-sectional view of the steering wheel shown in FIG. 4 after the steering wheel's upper housing has been depressed into the compressed position

Referring now to FIG. 5, a cross-sectional view of the steering wheel 110 is illustrated as a vehicle occupant (not shown) presses inwardly on the cover 120. Like FIG. 3, the pressure applied by the occupant is represented graphically by arrows 180. As noted above, the steering 110 is constructed such that as the vehicle occupant presses inwardly on the cover 120, the upper housing 122 depresses and moves from the normal position of FIG. 4 to the compressed position shown in FIG. 5.

Like the embodiments shown in FIG. 3, as the vehicle occupant presses inwardly on the cover 120, the horn assembly 164 is actuated. More specifically, as the occupant presses inwardly on the cover 120, the biasing effect of the springs 170 is overcome and the first contact 166 moves into contact with the second contact 168. Once this contact is established, the horn assembly 164 actuates and a sound is produced.

However, unlike the previous embodiment, depressing the upper housing 122 from the normal position into the compressed position does not produce a gap at the interface 152 between the cover 120 and the intermediate portion 118. Rather, as the vehicle occupant presses inwardly on the cover 120, the flex point 176 compensates for the movement of the upper housing 122 by bending and/or moving the cover 120 and/or the shingle 174. As a result, even when the upper housing 122 is in the compressed position, the cover 120 remains attached to the intermediate portion 118 and no gap is formed at the interface 152.

The steering wheel 110 may be further constructed such that if the occupant no longer presses inwardly on the cover 120, the upper housing 122 will move from the compressed position of FIG. 5 into the normal position of FIG. 4. Again, this is preferably accomplished by the springs 170 that bias the upper housing 122 towards the cover 120. Thus, if the occupant no longer presses against the cover 120, the biasing force of the springs 170 pushes and moves the upper housing 122 outwardly from the compressed position into the normal position.

In summary, the present invention provides a steering wheel in which the gap between the cover and the intermediate portion has been eliminated. In one embodiment, the intermediate portion overhangs the cover, and thus, if the cover is depressed, the gap will appear. In an alternative embodiment, the cover is attached to the intermediate portion such that even if the cover is depressed, no gap will be formed. As a result, many of the problems and limitations associated with prior art steering wheels having a gap at the airbag interface are eliminated by the teachings of the present invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A steering wheel comprising:
   a center portion;

an outer rim encircling the center portion;
an airbag cover positioned on the center portion capable of being depressed from a normal position to a compressed position;
an intermediate portion positioned between the center portion and the outer rim, the steering wheel being constructed such that there is no gap at an interface between the airbag cover and the intermediate portion when the airbag cover is in the normal position, wherein when the airbag cover is moved from the normal position to a compressed position a gap is produced at the interface between the airbag cover and the intermediate portion.

2. A steering wheel as in claim 1 wherein the intermediate portion comprises one or more functional features.

3. A steering wheel as in claim 1 wherein the intermediate portion comprises one or more decorative features.

4. A steering wheel as in claim 1 wherein the steering wheel further comprises an upper housing that is capable of being depressed from the normal position to the compressed position.

5. A steering wheel as in claim 4 wherein the steering wheel is constructed such that there is no gap at the interface between the cover and the intermediate portion when the upper housing is in the normal position.

6. A steering wheel as in claim 4 wherein the upper housing may be depressed from the normal position to the compressed position by applying a force to the cover.

7. A steering wheel as in claim 6 wherein the steering wheel is constructed such that if the force is removed, the upper housing will move from the compressed position into the normal position.

8. A steering wheel as in claim 4 further comprising a horn assembly configured such that depressing the airbag housing from the normal position to the compressed position actuates the horn assembly.

9. A steering wheel as in claim 8 wherein the horn assembly includes one or more springs.

10. A steering wheel as in claim 9 wherein the one or more springs function to move the upper housing from the compressed position to the normal position.

11. A steering wheel as in claim 1 wherein the intermediate portion includes an overhanging portion.

12. A steering wheel as in claim 11 wherein the overhanging portion is constructed to limit the outward movement of the airbag cover.

13. A steering wheel as in claim 1 further comprising a lower housing.

14. A steering wheel as in claim 13 wherein the intermediate portion is mounted to the lower housing.

15. A steering wheel as in claim 1 further comprising an airbag and an inflator.

16. A steering wheel as in claim 1 wherein the center portion comprises a casting.

17. A steering wheel as in claim 1 wherein the center portion includes a shell.

18. A steering wheel as in claim 1 further comprising one or more retention hangers that are designed to engage a retaining wire.

19. A steering wheel comprising:
a center portion;
an outer rim encircling the center portion;
an airbag cover positioned on the center portion; and
an intermediate portion positioned between the center portion and the outer rim, the intermediate portion comprising an overhanging portion constructed to overlap the airbag cover such that there is no gap at the interface between the airbag cover and the intermediate portion when the airbag cover is in a normal position, wherein the steering wheel further comprises an upper housing that is capable of being depressed from the normal position to a compressed position, wherein depressing the upper housing from the normal position to the compressed position produces a gap at the interface between the cover and the intermediate portion.

20. A steering wheel comprising:
a center portion;
an outer rim encircling the center portion;
an airbag cover positioned on the center portion, the cover comprising a shingle; and
an intermediate portion positioned between the center portion and the outer rim, the intermediate portion attached to the shingle such that there is no gap at the interface between the cover and the intermediate portion, wherein the cover comprises a flex point designed to allow the cover to flex when the cover moves between a normal position and a compressed position.

21. A steering wheel comprising:
a center portion;
an outer rim encircling the center portion;
an airbag cover positioned on the center portion, the cover comprising a shingle; and
an intermediate portion positioned between the center portion and the outer rim, the intermediate portion attached to the shingle such that there is no gap at the interface between the cover and the intermediate portion, wherein the steering wheel further comprises an upper housing that is capable of being depressed from a normal position to a compressed position, wherein depressing the upper housing from the normal position to the compressed position does not produce a gap at the interface between the cover and the intermediate portion.

22. An intermediate portion designed to be positioned on a steering wheel between a center portion and an outer rim, the intermediate portion being attached to a shingle constructed such that there is no gap between the intermediate portion and an airbag cover, wherein the cover comprises a flex point designed to allow the cover to flex when the cover moves between a normal position and a compressed position.

* * * * *